US011919632B2

(12) United States Patent
Nam et al.

(10) Patent No.: US 11,919,632 B2
(45) Date of Patent: Mar. 5, 2024

(54) AIR MOBILITY DEVICE USING COMPRESSED AIR

(71) Applicants: HYUNDAI MOTOR COMPANY, Seoul (KR); KIA CORPORATION, Seoul (KR)

(72) Inventors: Youn Sic Nam, Daejeon (KR); Myeong Man Park, Incheon (KR); Kwan Ho Moh, Gunpo-si (KR); Keon Woo Kim, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 79 days.

(21) Appl. No.: 17/702,558

(22) Filed: Mar. 23, 2022

(65) Prior Publication Data

US 2023/0022007 A1    Jan. 26, 2023

(30) Foreign Application Priority Data

Jul. 23, 2021 (KR) .......... 10-2021-0097326

(51) Int. Cl.
*B64C 29/00* (2006.01)
*B64C 39/06* (2006.01)

(52) U.S. Cl.
CPC ........ *B64C 29/0033* (2013.01); *B64C 39/066* (2013.01)

(58) Field of Classification Search
CPC ............ B64C 2033/0226; B64C 39/06; B64C 39/066; B64C 39/068; B64C 21/01; B64C 21/04; B64C 27/18; B64C 29/0016; B64C 29/0033; B64D 2033/0226
See application file for complete search history.

(56) References Cited

U.S. PATENT DOCUMENTS

| | | | | |
|---|---|---|---|---|
| 2,376,834 A | * | 5/1945 | Norman | B64C 21/04 251/297 |
| 3,018,034 A | * | 1/1962 | Ferri | B64C 29/0025 244/12.3 |
| 3,335,976 A | * | 8/1967 | Kappus | B64C 29/0025 244/12.3 |
| 11,597,509 B1 | * | 3/2023 | Alfaro | B64C 29/0025 |
| 2017/0203839 A1 | * | 7/2017 | Giannini | B64D 27/24 |
| 2018/0044013 A1 | * | 2/2018 | Groninga | B64C 15/12 |
| 2020/0324891 A1 | * | 10/2020 | Evulet | B64D 27/16 |
| 2022/0290676 A1 | * | 9/2022 | Imai | B64C 39/005 |
| 2023/0086655 A1 | * | 3/2023 | Wang | B64C 3/40 244/7 A |

FOREIGN PATENT DOCUMENTS

| | | | |
|---|---|---|---|
| DE | 1481542 A1 | * | 3/1969 |
| DE | 1481574 A1 | * | 5/1969 |
| DE | 1924165 A1 | * | 11/1969 |
| FR | 3127478 A1 | * | 3/2023 |
| KR | 20020071616 A | | 9/2002 |
| KR | 102096778 B1 | | 4/2020 |
| KR | 102165213 B1 | | 10/2020 |

* cited by examiner

Primary Examiner — Joshua J Michener
Assistant Examiner — Ryan Andrew Yankey
(74) Attorney, Agent, or Firm — Lempia Summerfield Katz LLC

(57) ABSTRACT

An air mobility device improves propulsion due to the Coandă effect when flying so as to increase a flying range and reduces noise when flying.

12 Claims, 6 Drawing Sheets

AIR MOBILITY DEVICE USING COMPRESSED AIR

CROSS-REFERENCE TO RELATED APPLICATION

This application claims priority to Korean Patent Application No. 10-2021-0097326, filed on Jul. 23, 2021 in the Korean Intellectual Property Office, the disclosure of which is incorporated herein by reference in its entirety.

BACKGROUND

1. Field of the Disclosure

The present disclosure relates to an air mobility device, which improves propulsion through the Coandă effect and thus increases a flying range.

2. Description of the Related Art

Recently, air mobility devices, which are usable in various fields, such as cargo containers, medical transport, etc., are being developed. Methods for increasing and stabilizing energy efficiency of air mobility devices have been developed and are now in the stage of practical use.

Such an air mobility device flies through driving of propellers, but there are limits to secure the flight performance of the air mobility device only using propulsion generated due to rotation of the propellers.

Further, when the size of the propellers is increased so as to secure the flight performance of the air mobility device, noise is generated. In order to solve this problem, a distributed propulsion method using a plurality of electric motors is used to minimize generation of noise. However, operating noise is inevitably generated due to an increase in the speed of the propellers when the propellers are operated.

The above information disclosed in the Background section is only to enhance understanding of the background of the present disclosure and should not be interpreted as conventional technology that is already known to those having ordinary skill in the art.

SUMMARY

Therefore, the present disclosure has been made in view of the above problems. It is an object of the present disclosure to provide an air mobility device, which improves propulsion due to the Coandă effect when flying so as to increase a flying range and reduces noise when flying.

In accordance with the present disclosure, the above and other objects can be accomplished by providing an air mobility device as disclosed and described herein. The air mobility device includes a main body, compression motors provided in the main body so as to form compressed air, and wings installed on the main body so as to be rotatable. The wings are configured to have respective open spaces formed therein such that external air passes through the open spaces and the compressed air formed by the compression motors flows into the wings and is discharged to the open spaces. The air mobility device also includes blowers configured to generate air flow so as to generate propulsion and installed at positions of the open spaces of the wings, to which the compressed air is discharged. Thus, the compressed air flows into the blowers so as to increase the propulsion.

Each of the wings may include a first wing panel and a second wing panel installed on the main body and configured to have an inner space formed therein so as to circulate the compressed air transmitted by a corresponding one of the compression motors thereinto. The first wing panel and the second wing panel may be spaced apart from each other so as to form the open space therebetween.

The first wing panel and the second wing panel may be connected so that the inner spaces thereof communicate with each other so as to form a connection part configured such that the compressed air is circulated therein. The connection part may be rotatably connected to each of the wings so that the compressed air flows into each of the wings through the connection part and is distributed to the first wing panel and the second wing panel.

A plurality of driving motors configured to adjust rotated positions of the respective wings may be provided in the main body. The connection part of each of the wings may be connected to a corresponding one of the respective driving motors.

The compression motors may be provided in plural so as to respectively provide the compressed air to the first wing panel and the second wing panel.

Distal ends of the first wing panel and the second wing panel far away from the main body may be connected to each other so that the inner spaces thereof communicate with each other.

First discharge holes configured to discharge the compressed air may be formed in the first wing panel, second discharge holes configured to discharge the compressed air may be formed in the second wing panel, and the first discharge holes and the second discharge holes may be disposed to face each other.

The blowers may be installed adjacent to the first discharge holes and the second discharge holes so that the compressed air discharged through the first discharge holes and the second discharge holes flows into the blowers.

When the wings are rotated so that the first wing panel and the second wing panel of each of the wings are erected, the propulsion through the blowers may be generated in upward and downward directions and thus the main body may fly vertically. When the wings are rotated so that the first wing panel and the second wing panel of each of the wings are laid down, the propulsion through the blowers may be generated in forward and rearward directions and thus the main body may fly horizontally.

Inner surfaces and outer surfaces of the first wing panel and the second wing panel may be formed in an asymmetrically streamlined shape.

When the wings are rotated so that the first wing panel and the second wing panel of each of the wings are laid down, the first wing panel may be located in a lower region and the second wing pane may be located in an upper region. Each of the first wing panel and the second wing panel may be configured such that an inner surface thereof has a greater curvature than an outer surface thereof.

When the wings are rotated so that the first wing panel and the second wing panel of each of the wings are rotated to be laid down, the first wing panel may be located in a lower region and the second wing pane may be located in an upper region, and the first wing panel may extend to have a greater length than the second wing panel.

When the wings are rotated so that the first wing panel and the second wing panel of each of the wings are rotated to be laid down, the first wing panel may be located in a lower region and the second wing pane may be located in an upper region, and the first wing panel may be formed to have a greater width than the second wing panel.

The wings may be provided in plural at front and rear parts of the main body. The blowers may be configured such that at least one blower is provided in each of the wings.

BRIEF DESCRIPTION OF THE DRAWINGS

The above and other objects, features, and other advantages of the present disclosure should be more clearly understood from the following detailed description taken in conjunction with the accompanying drawings, in which.

DETAILED DESCRIPTION OF THE EMBODIMENTS

Reference is made in detail to the embodiments of the present disclosure, examples of which are illustrated in the accompanying drawings. Wherever possible, the same reference numbers are used throughout the drawings to refer to the same or like parts. When a component, device, element, or the like of the present disclosure is described as having a purpose or performing an operation, function, or the like, the component, device, or element should be considered herein as being "configured to" meet that purpose or to perform that operation or function.

Figure 1:
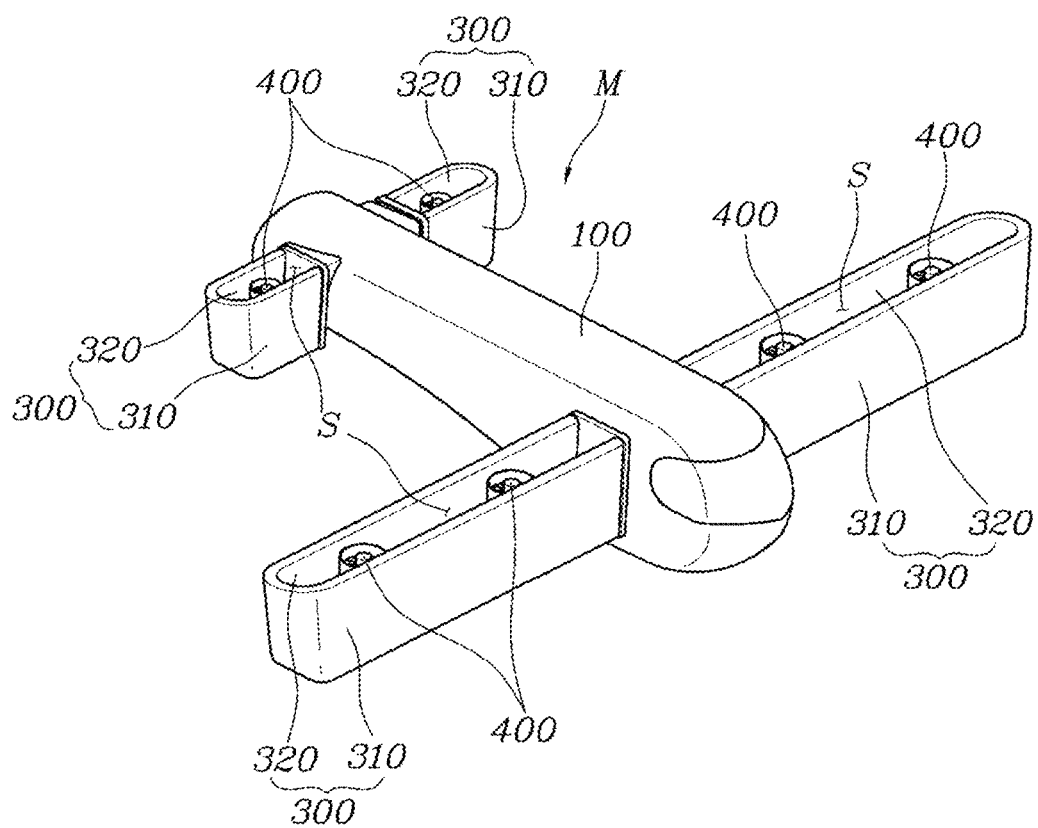
FIG. 1 is a perspective view illustrating an air mobility device according to the present disclosure when vertically flying.
Figure 2:
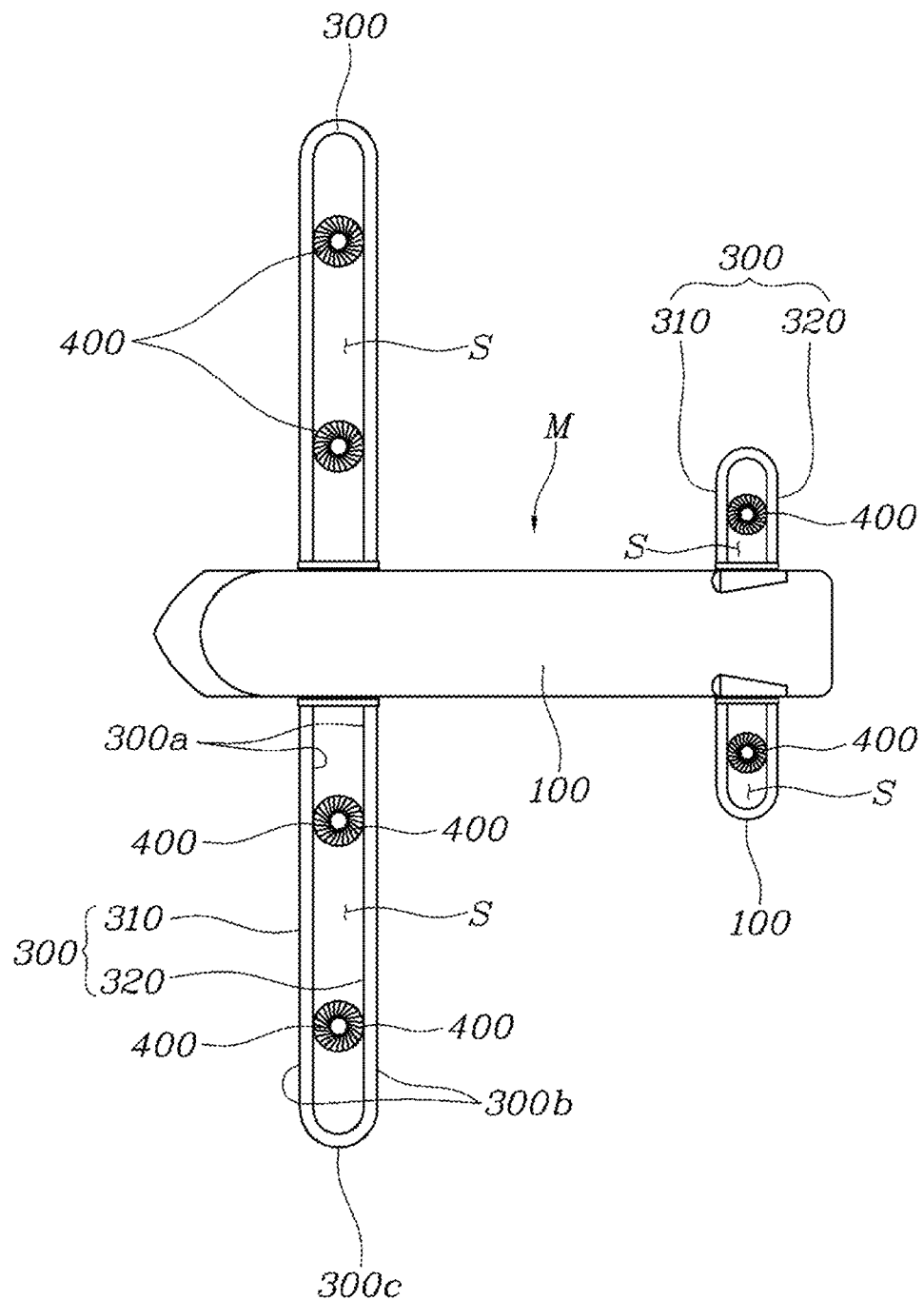
FIG. 2 is a plan view of the air mobility device shown in FIG. 1.
Figure 3:
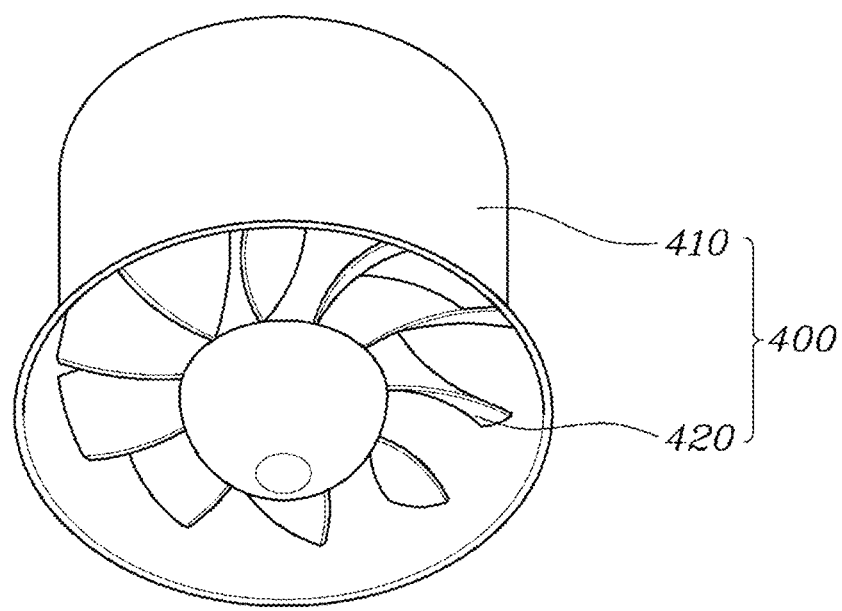
FIG. 3 is a perspective view illustrating a blower according to the present disclosure.
Figure 4:
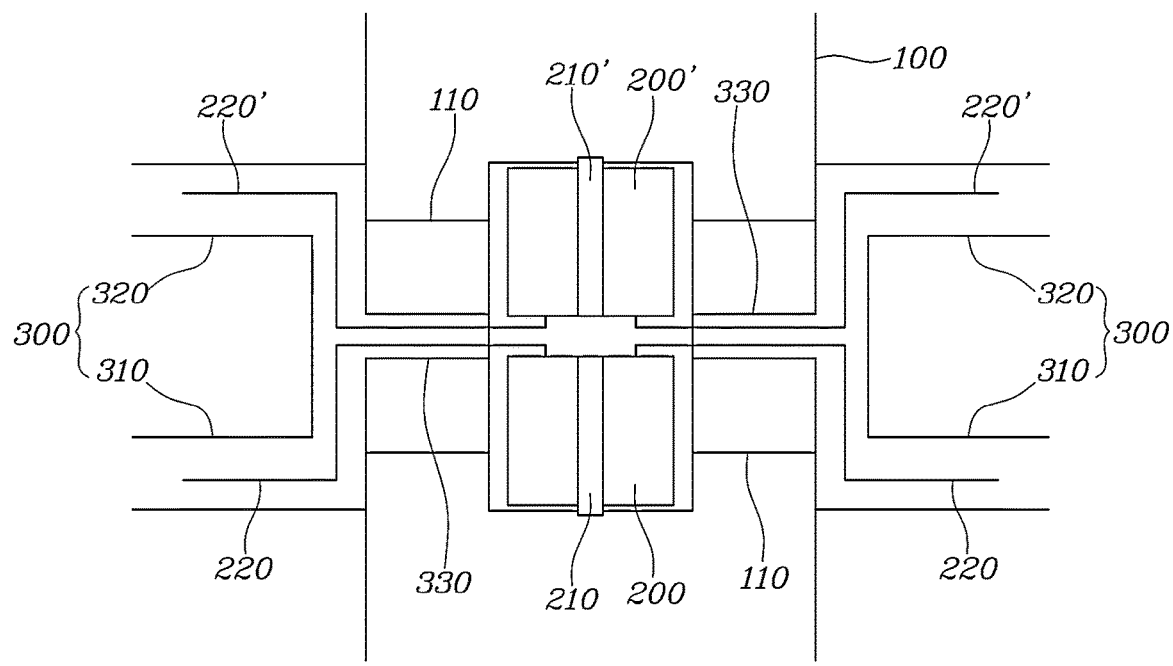
FIG. 4 is a view illustrating compression motors and driving motors provided in a main body and wings.
Figure 5:
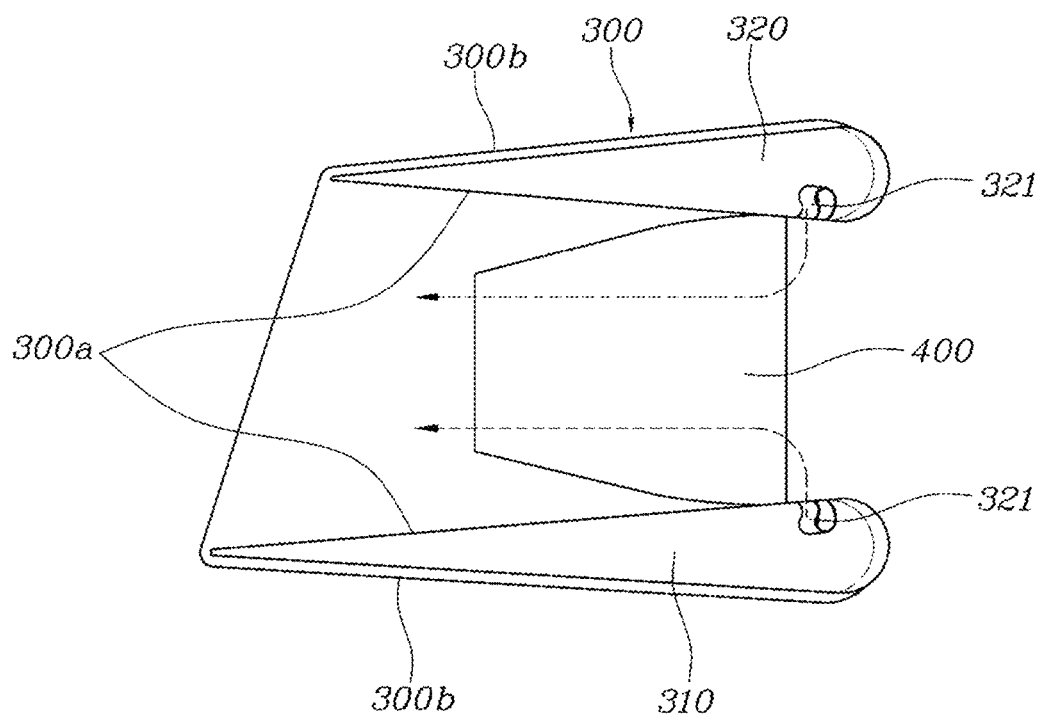
FIG. 5 is a view illustrating a first wing panel and a second wing panel of the wing and illustrating the blower.
Figure 6:
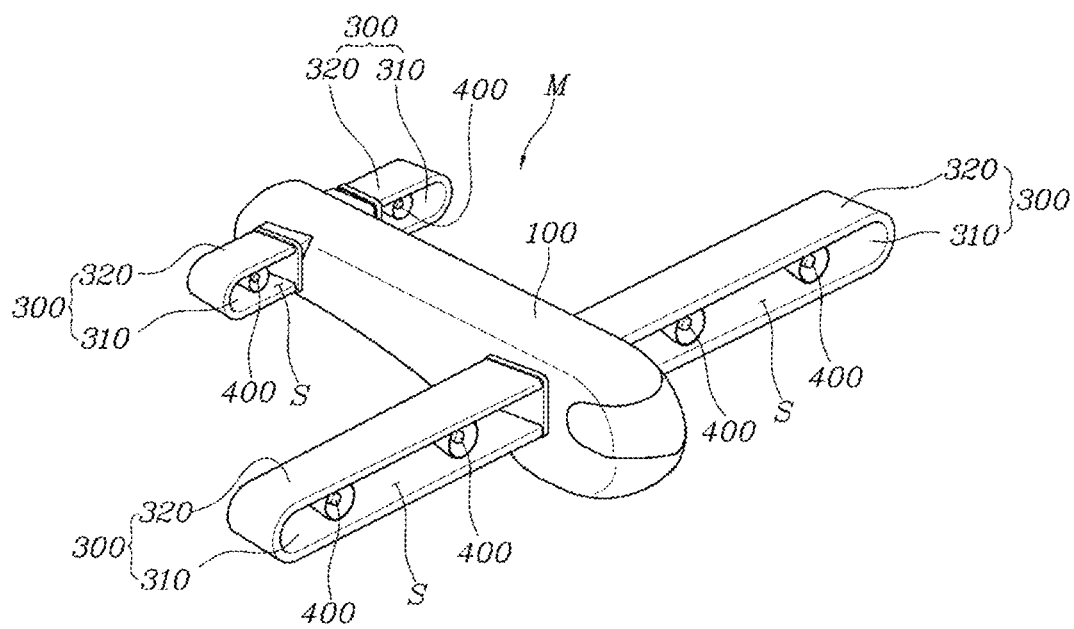
FIG. 6 is a perspective view illustrating the air mobility device shown in FIG. 1 when horizontally flying.

FIG. 1 is a perspective view illustrating an air mobility device according to the present disclosure when vertically flying. FIG. 2 is a plan view of the air mobility device shown in FIG. 1. FIG. 3 is a perspective view illustrating a blower according to the present disclosure. FIG. 4 is a view illustrating compression motors and driving motors provided in a main body and wings. FIG. 5 is a view illustrating a first wing panel and a second wing panel of the wing and illustrating the blower. FIG. 6 is a perspective view illustrating the air mobility device shown in FIG. 1 when horizontally flying.

An air mobility device M according to the present disclosure includes, as shown in FIGS. 1 and 2, a main body 100, compression motors 200, 200' provided in the main body 100 so as to form compressed air, and wings 300 installed on the main body 100 so as to be rotatable. The wings 300 are configured to have respective open spaces S formed therein such that external air passes through the open spaces S and the compressed air formed by the compression motors 200, 200' flows into the wings 300 and is discharged to the open spaces S. The air mobility device M also includes blowers 400 configured to generate air flow so as to generate propulsion and installed at positions of the open spaces S of the wings 300, to which the compressed air is discharged. Thus, the compressed air flows into the blowers 400 so as to increase propulsion.

The main body 100 is provided with a space therein and into which passengers reside or be seated, or in which baggage is loaded. The compression motors 200, 200' are configured to form the compressed air and driving motors 110 are configured to adjust the rotated positions of the wings 300 and are provided in the main body 100.

The wings 300 are installed on the side surfaces of the main body 100 so as to be rotatable. Here, a plurality of the wings 300 may be provided at the front and rear parts of the main body 100 depending on the flight performance of the air mobility device M.

Particularly, the wings 300 are connected to the compression motors 200, 200' when the wings 300 are installed on the main body 100 so that the compressed air formed by the compression motors 200, 200' may flow into the wings 300. The wings 300 are hollow so that the compressed air flowing thereinto may be circulated therein. Further, the open spaces S are respectively formed inside the wings 300 so that external air passes through the open spaces S and so that the compressed air is discharged to the open spaces S from the insides of the wings 300. Thus, the external air and the compressed air meet in the open spaces S so as to be moved together. Here, each of the compression motors 200, 200' includes an air inlet pipe 210, 210' into which air flows and includes air outlet pipes 220,220' configured to provide the compressed air to first wing panels 310 or second wing panels 320 of the wings 300.

Therefore, the external air and the compressed air flow into the blowers 400 provided in the open spaces S of the wings 300. The flow rate of air is increased due to operation of the blowers 400, and thus propulsion is improved. In other words, as shown in FIG. 3, each of the blowers 400 includes a housing 410 and a fan 420. Air flow is generated due to rotation of the fan 40 and thus propulsion is generated. The compressed air together with the external air flows into the housing 410. The flow rate of air due to rotation of the fan 40 is increased and thus propulsion is improved. In this case, a plurality of the blowers 400 may be provided in each of the wings 300 depending on the flight performance of the air mobility device M.

In more detail, as shown in FIGS. 1-4, each of the wings 300 includes the first wing panel 310 and the second wing panel 320 installed on the main body 100 and configured to have an inner space formed therein so as to circulate the compressed air transmitted by the compression motors 200, 200' thereinto. The first wing panel 310 and the second wing panel 320 are spaced apart from each other so as to form the open space S therebetween.

As such, the wing 300 includes the first wing panel 310 and the second wing panel 320 disposed to face each other. The open space S is formed between the first wing panel 310 and the second wing panel 320. As the wing 300 has such a dual wing structure, the blowers 400 may be firmly installed between the first wing panel 310 and the second wing panel 320. The Coandă effect may occur through air circulated between the first wing panel 310 and the second wing panel 320.

The wing 300 according to the present disclosure is described in more detail below.

As shown in FIG. 4, the first wing panel 310 and the second wing panel 320 are connected so that the inner spaces thereof may communicate with each other so as to form a connection part 330 in which the compressed air is circulated. The connection part 330 is rotatably connected to the wing 300 so that the compressed air flows into the wing 300 through the connection part 330 and is distributed to the first wing panel 310 and the second wing panel 320.

As such, proximal ends of the first wing panel 310 and the second wing panel 320 are connected to form the connection part 330 and the connection part 330 is rotatably installed on the main body 100. Thus, the first wing panel 310 and the second wing panel 320 may be rotated about the connection part 330.

Further, when the connection part 330 is installed on the main body 100, the compressed air formed by the compression motors 200, 200' flows into the connection part 330. Thus, the compressed air may be circulated towards the first wing panel 310 and the second wing panel 320 through the connection part 330.

Moreover, the first wing panel 310 and the second wing panel 320 are rotatably installed on the main body 100 by the connection part 330. Thus, the installation structure of the first wing panel 310 and the second wing panel 320 on the main body 100 may be simplified.

A plurality of the driving motors 110 configured to adjust the rotated positions of the respective wings 300 may be provided in the main body 100. The connection part 330 of each of the wings 330 may be connected to a corresponding one of the respective driving motors 110.

A plurality of the driving motors 110 configured to adjust the rotated positions of the respective wings 300 is provided in the main body 100 and the connection part 330 of each of the wings 330 is connected to a corresponding one of the respective driving motors 110. Thus, the respective wings 300 installed on the main body 100 may be individually controlled so as to be rotated to different positions.

In other words, because the rotated positions of the wings 300 installed on the left and right sides of the main body 100 are individually controlled by the corresponding driving motors 110, the directions of the air flow through the wings 300 and the directions of propulsion through the blowers 400 are differently changed in the respective wings 300. Thus, the air mobility device M may be moved to a position required when flying or when taking off and landing.

The compression motors 200, 200' may be provided in plural so as to respectively provide compressed air to the first wing panel 310 and the second wing panel 320 of each of the wings 300. As the compression motors 200, 200' are provided in plural and the compression motors 200, 200' are respectively connected to the first wing panel 310 and the second wing panel 320 of each of the wings 300, the volumes of the compressed air flowing into the first wing panel 310 and the second wing panel 320 of each of the wings 300 may be secured.

Further, as the compression motors 200, 200' are respectively connected to the first wing panel 310 and the second wing panel 320 of each of the wings 300, lopsided provision of the compressed air to any one of the first wing panel 310 and the second wing panel 320 may be prevented.

Distal ends 300c of the first wing panel 310 and the second wing panel 320 far away from the main body 100 may be connected to each other so that the inner spaces thereof communicate with each other.

As shown in FIG. 2, the distal ends 300c of the first wing panel 310 and the second wing panel 320 are connected to each other. Thus, stability of the first wing panel 310 and the second wing panel 320 may be assured. Further, because the inner spaces of the first wing panel 310 and the second wing panel 320 communicate with each other and thus share the compressed air flowing thereinto, the flow rate of the compressed air discharged through the first wing panel 310 and the second wing panel 320 is not lopsided to any one side.

Further, as shown in FIG. 5, first discharge holes 311 configured to discharge the compressed air are formed in the first wing panel 310. Second discharge holes 312 configured to discharge the compressed air are formed in the second wing panel 320. The first discharge holes 311 and the second discharge holes 312 are disposed to face each other.

In other words, the compressed air flowing into the first wing panel 310 is discharged to the open space S through the first discharge holes 311. Also, the compressed air flowing into the second wing panel 320 is discharged to the open space S through the second discharge holes 312. Further, the first discharge holes 311 and the second discharge holes 321 are disposed to face each other. Thus, the compressed air discharged from the first wing panel 310 and the second wing panel 320 may be concentrated on designated positions of the open space S. The blowers 400 are installed adjacent to the first discharge holes 311 and the second discharge holes 321 so that the compressed air discharged through the first discharge holes 311 of the first wing panel 310 and the second discharge holes 321 of the second wing panel 320 flows into the blowers 400. Thus, the flow rate of air flowing into the blowers 400 may be increased and propulsion through the blowers 400 may be improved.

In other words, the blowers 400 are installed between the first wing panel 310 and the second wing panel 320 adjacent to the first discharge holes 311 and the second discharge holes 312. Thus, the compressed air discharged through the first discharge holes 311 and the second discharge holes 312 directly flows into the blowers 400, loss of the compressed air is minimized, and the flow rate of air is secured.

Further, the first discharge holes 311 and the second discharge holes 312 are formed to be inclined towards the blowers 400 so that the compressed air having passed through the first discharge holes 311 and the second discharge holes 312 may be more smoothly transmitted to the blowers 400.

Inner surfaces 300a and outer surfaces 300b of the first wing panel 310 and the second wing panel 320 may be formed in an asymmetrically streamlined shape. Therefore, lift force may be generated due to the flow of air on the first wing panel 310 and the second wing panel 320.

In more detail, when the wings 300 are rotated to be laid down, the first wing panel 310 of each of the wings 300 is located in a lower region. Further, the second wing panel 320 of each of the wings 300 is located in an upper region.

In other words, each of the wings 300 includes the first wing panel 310 and the second wing panel 320. The first wing panel 310 of each of the wings 300 is located in front of the second wing panel 320 when the wings 310 are rotated to be erected. The first wing panel 310 of each of the wings 300 is located below the second wing panel 320 when the wings 310 are rotated to be laid down. One reason for this is to generate lift force appropriate for flying due to shape and size differences between the first wing panel 310 and the second wing panel 320. Another reason for this is to provide the Coandă effect of the compressed air discharged from the first wing panel 310 and the second wing panel 320.

For this purpose, the first wing panel 310 and the second wing panel 320 are configured such that the inner surface 300a has a greater curvature than the outer surface 300b.

As the first wing panel 310 and the second wing panel 320 are configured such that the inner surface 300a has a greater curvature than the outer surface 300b facing the inner surface 300a, lift force is generated between the first wing panel 310 and the second wing panel 320, and the flow velocity of air is increased. In other words, the Coandă effect occurs between the first wing panel 310 and the second wing panel 320.

Therefore, the compressed air discharged from the first wing panel 310 and the second wing panel 320 flows along the inner surfaces 300a of the first wing panel 310 and the second wing panel 320. As a result, the flow rate of air is increased, the air having the increased flow rate flows into the blowers 400, and thus propulsion through the blowers 400 is improved.

Further, the first wing panel 310 may extend to have a greater length than the second wing panel 320 and may be formed to have a greater width than the second wing panel 320.

Thus, lift force enabling the air mobility device M to fly is generated by the first wing panel 310 and the second wing panel 320. Therefore, although the blowers 400 are not operated when the air mobility device M is flying, the air mobility device M may fly using lift force generated by the first wing panel 310 and the second wing panel 320.

Through this, in an area in which a noise problem needs to be reduced, such as a downtown area, the noise problem may be solved through flight of the air mobility device M using lift force generated by the first wing panels 310 and the second wing panels 320 of the wings 300 while stopping operation of the blowers 400. Sudden fall of the air mobility device M may be prevented through gliding using the first wing panels 310 and the second wing panels 320.

Through the above-described structure of the wings 300, when the wings 300 are rotated so that the first wing panels 310 and the second wing panels 320 of the wings 300 are erected, propulsion though the blowers 400 is generated in the upward and downward directions. Thus, the main body 100 of the air mobility device M flies vertically.

In other words, as shown in FIG. 1, when the wings 30 are disposed so that the first wing panels 310 and the second wing panels 320 of the wings 300 are erected, the blowers 400 are also disposed to be erected. Thus, propulsion through the blowers 400 is generated in the downward direction. Therefore, the air mobility device M may fly vertically, i.e., in the upward and downward directions.

On the other hand, when the wings 300 are disposed so that the first wing panels 310 and the second wing panels 320 of the wings 300 are laid down, propulsion through the blowers 400 is generated in the forward and rearward directions. Thus, the main body 100 of the air mobility device M flies horizontally.

In other words, as shown in FIG. 6, when the wings 300 are disposed such that the first wing panels 310 and the second wing panels 320 of the wings 300 are laid down, the blowers 400 are also disposed to be laid down. Thus, propulsion through the blowers 400 is generated in the rearward direction. Therefore, the air mobility device M may fly horizontally, i.e., in the forward and rearward directions.

Further, the air mobility device M may individually adjust the rotated positions of the wings 300 disposed on both side surfaces of the main body 100 and thus may be capable of implementing various flying modes.

The air mobility device M having the above-described structure improves propulsion due to the Coandă effect when flying so as to increase a flying range and reduces noise generated due to driving of propellers.

As is apparent from the above description, an air mobility device according to the present disclosure improves propulsion due to the Coandă effect when flying so as to increase a flying range and reduces noise when flying.

Although embodiments of the present disclosure have been disclosed for illustrative purposes, those having ordinary skill in the art should appreciate that various modifications, additions, and substitutions are possible, without departing from the scope and spirit of the inventive concept as disclosed in the accompanying claims.

What is claimed is:

1. An air mobility device comprising:
a main body;
compression motors provided in the main body so as to form compressed air;
wings installed on the main body so as to be rotatable and configured to have respective open spaces formed therein such that external air passes through the open spaces and the compressed air formed by the compression motors flows into the wings and is discharged to the open spaces; and
blowers configured to generate air flow so as to generate propulsion and installed at positions of the open spaces of the wings, to which the compressed air is discharged, such that the compressed air flows into the blowers so as to increase the propulsion,
wherein each of the wings comprises a first wing panel and a second wing panel installed on the main body,
wherein the first wing panel and the second wing panel form an inner space so as to circulate the compressed air transmitted by at least one of the compression motors, and the first wing panel and the second wing panel are spaced apart from each other so as to form the open space therebetween, and
wherein first discharge holes configured to discharge the compressed air are formed in the first wing panel, second discharge holes configured to discharge the compressed air are formed in the second wing panel, and the first discharge holes and the second discharge holes are disposed to face each other.

2. The air mobility device according to claim 1, wherein the first wing panel and the second wing panel are connected so that the inner spaces formed by the first wing panel and the second wing panel communicate with each other so as to form a connection part configured such that the compressed air is circulated therein, and wherein the connection part is rotatably connected to each of the wings so that the compressed air flows into each of the wings through the connection part and is distributed to the first wing panel and the second wing panel.

3. The air mobility device according to claim 2, wherein a plurality of driving motors configured to adjust rotated positions of the respective wings is provided in the main body, and wherein the connection part of each of the wings is connected to a corresponding one of the respective driving motors.

4. The air mobility device according to claim 1, wherein the compression motors respectively correspond to the first wing panel and the second wing panel and provide the compressed air to a corresponding wing panel of the first wing panel and the second wing panel.

5. The air mobility device according to claim 1, wherein distal ends of the first wing panel and the second wing panel are connected to each other so that the inner space formed by the first wing panel and the second wing panel communicate with each other.

6. The air mobility device according to claim 1, wherein the blowers are installed adjacent to the first discharge holes and the second discharge holes so that the compressed air discharged through the first discharge holes and the second discharge holes flows into the blowers.

7. The air mobility device according to claim 1, wherein:
when the wings are rotated so that the first wing panel and the second wing panel of each of the wings are erected, the propulsion through the blowers is generated in a vertical direction, and thus the main body flies vertically; and when the wings are rotated so that the first wing panel and the second wing panel of each of the wings are laid down, the propulsion through the blowers is generated in a longitudinal direction, and thus the main body flies horizontally.

8. The air mobility device according to claim 1, wherein inner surfaces and outer surfaces of the first wing panel and the second wing panel are formed in an asymmetrically streamlined shape.

9. The air mobility device according to claim 1, wherein, when the wings are rotated so that the first wing panel and the second wing panel of each of the wings are laid down, and the first wing panel is located in a lower region and the second wing pane is located in an upper region.

10. The air mobility device according to claim 1, wherein, when the wings are rotated so that the first wing panel and the second wing panel of each of the wings are rotated to be laid down, the first wing panel is located in a lower region and the second wing pane is located in an upper region, and the first wing panel is configured to extend length longer than the second wing panel.

11. The air mobility device according to claim 1, wherein, when the wings are rotated so that the first wing panel and the second wing panel of each of the wings are rotated to be laid down, the first wing panel is located in a lower region and the second wing pane is located in an upper region, and wherein a width of the first wing panel is formed to be larger than a width of the second wing panel.

12. The air mobility device according to claim 1, wherein the wings are provided in plural at front and rear parts of the main body, and wherein the blowers are configured such that at least one blower is provided in each of the wings.

\* \* \* \* \*